United States Patent [19]
Barton et al.

[11] 3,903,837
[45] Sept. 9, 1975

[54] DIAL INDICATOR DEVICE

[76] Inventors: Dan K. Barton, 935 Graybar, Valinda, Calif. 91744; William Weber, 2764 S. Montellano, Hacienda Heights, Calif. 91745

[22] Filed: Dec. 28, 1973

[21] Appl. No.: 429,103

[52] U.S. Cl. ............................. 116/133; 235/88
[51] Int. Cl. ........................................ G09f 9/00
[58] Field of Search .............. 116/130, 133–135; 235/78 G, 78 RC, 88 G, 88 RC

[56] References Cited
UNITED STATES PATENTS

| | | | |
|---|---|---|---|
| 1,584,559 | 5/1926 | Kroger | 116/133 X |
| 2,533,883 | 12/1950 | Gelb | 116/133 |
| 2,629,951 | 3/1953 | Kittridge | 116/133 X |
| 2,690,664 | 10/1954 | Miller | 116/133 X |
| 2,803,213 | 8/1957 | Smith | 116/133 |
| 3,304,907 | 2/1967 | Block | 116/133 |

Primary Examiner—Richard C. Queisser
Assistant Examiner—Daniel M. Yasich
Attorney, Agent, or Firm—Francis X. Lo Jacono, Sr.

[57] ABSTRACT

A dial indicator device comprising a base member which is adapted to be secured to a stationary member, such as a storage bin or box, in which various items are stored therein, the base having a plurality of colors or indicia disposed on the outer face thereof, whereby any one of the markings can be selectively exposed by a rotatable cover dial which is provided with an opening within the face of the dial, thus visually indicating the status of the item within a particular bin.

3 Claims, 7 Drawing Figures

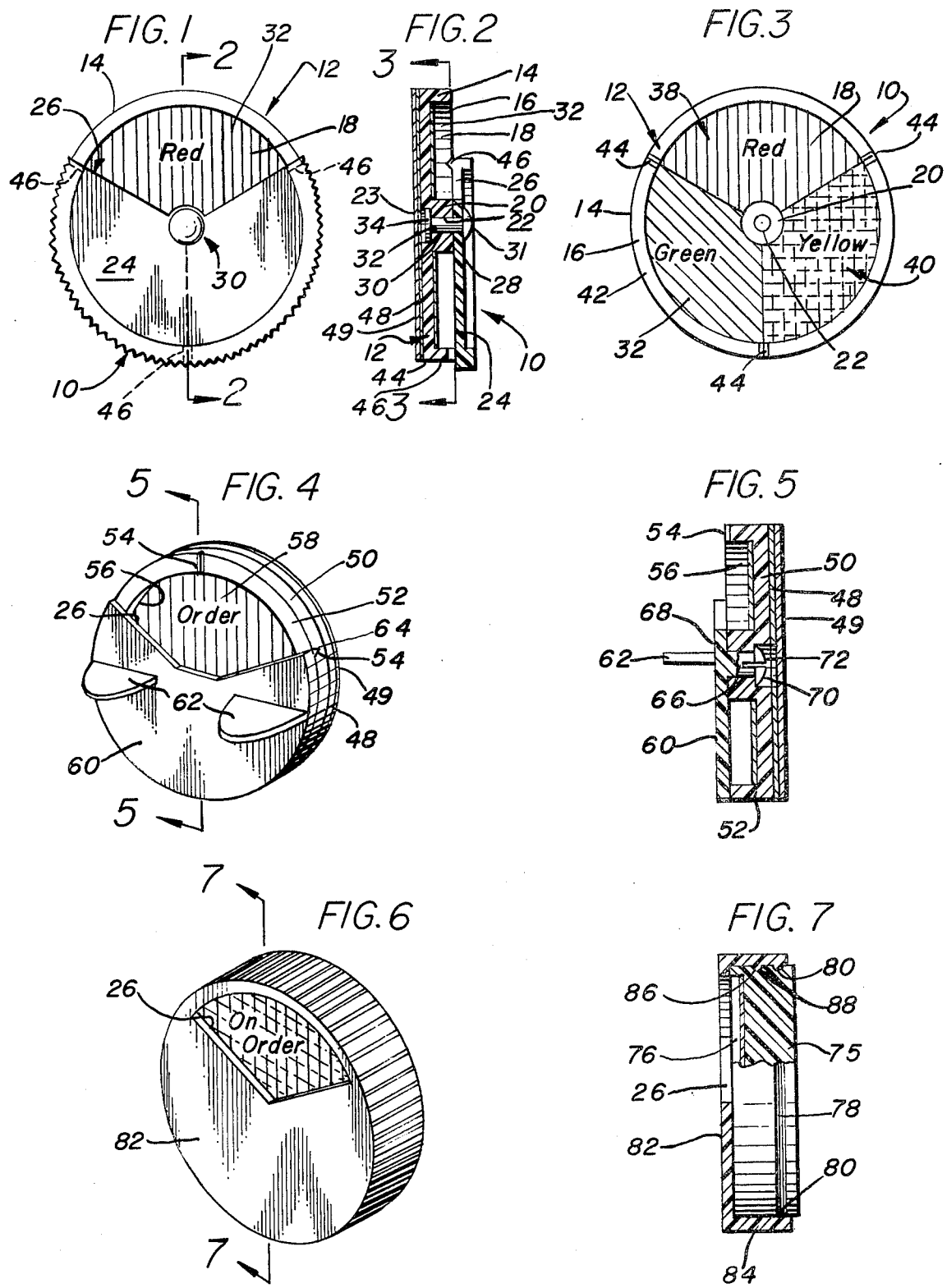

DIAL INDICATOR DEVICE

BACKGROUND

1. Field of the Invention

This invention relates generally to a content indicator and relates, more particularly, to a device to indicate the status of low-cost items stored in bins and the like.

2. Description of the Prior Art

There are various kinds of indicating devices but none have been designed to solve the specific problem of controlling the level of storage of low-cost items. There is a need for a simple, inexpensive device for use in material control, particularly in what is known in the industry as Control Class "C" Inventory. Class "C" Inventory consists of all inexpensive items such as nuts, bolts, washers, paper stock, and a vast multitude of other low-cost items that are constantly being depleted in bins or any other stockroom areas. Thus, while this type of inventory is inexpensive, the lack of such items can cause an entire assembly line to shut down. Inventory of low-cost "C" items should not be controlled by perpetual inventory records such as Kardex or IBM systems since its control would then become very impractical and expensive, for obvious reasons.

Most companies refer to this type of inventory as "Bin Stock" and have hit or miss methods of keeping adequate stock in continuous, uninterrupted supply. Generally, these companies have to rely on their chief stock clerks, whether or not adequate control of supplies can be maintained for these items; and, at best, this method produces only fair results. As an example, in a manufacturing company that has 10,000 purchased parts in its inventory, approximately 60% or better will be Class "C" stock. This 60% of inventory will represent generally 5% to 10% of the overall inventory value.

Hence, there is a need for a simple visual-control device whereby any individual having access to a stockroom or storage bins will readily, at a glance, observe the inventory status of any particular item in stock. The use of such a device aids the timely re-order of items and insures the replenishment of depleted stock.

To the applicants' knowledge, there is no similar device in use today that is capable of controlling the stock of low-cost items in the very simple and efficient manner such as the device herein disclosed.

SUMMARY

This invention provides a simple, inexpensive, visual-control, dial-indicator device whereby the supply of stock items of the low-cost variety such as nuts, bolts, screws, paper stock, etc., particularly those stored in bins, is readily controlled.

The device comprises, generally, a base member adapted to be affixed adjacent to the items stocked or secured to a storage bin, or the like, by means of pressure-sensitive adhesive applied to the back surface of the base member. The base member is also provided with a circular recess defined by an annular upturned lip. Secured and disposed within the recessed area is a thin sheet material having printed thereon a plurality of various colored sections, or sections having various letters or symbols printed thereon, whereby the inventory status of the stored items can be very readily ascertained by the exposure of the proper symbol or color.

Thus, in order to provide a constant, up-to-date, controlled supply of fast-moving, low-cost items, there is included a dial member which is rotatably attached to the base member by a centrally-disposed connecting means. Thus, the dial defines a cover having an opening or an enlarged notched section wherein the indicia or marking in the recess of the base member can be exposed for reading.

Means for positioning the dial cover is also provided and comprises a plurality of notches disposed about the annular upturned lip, which corresponds and cooperates with a plurality of aligned projecting teeth members. These teeth are received within the notches to locate the opening within the cover whereby accidental movement cannot occur.

OBJECTS AND ADVANTAGES

It is an object of the present invention to provide a dial-indicator device that is easy to operate and understand without the need for detailed instructions.

It is another object of the invention to provide a dial-indicator device having a plurality of colored sections, or a section having various letters or symbols printed thereon, whereby the status of stored items can be readily ascertained. That is, by use of said markings one can, at a glance, know whether the items are in low supply and should be re-ordered, if the items have been re-ordered, or if sufficient numbers of the items are stored and there is no need to re-order said items.

Still another object of the invention is to provide a device of this character that is readily attached to a bin box, a shelf edge, or any desirable location, without the aid of tools.

A further object of the invention is to provide a device of this character that is simple and rugged in construction.

Another object of the present invention is to provide a visual dial-indicator device that is relatively inexpensive to manufacture.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 1 is a front-elevational view of the present invention;

FIG. 2 is a cross-sectional view thereof taken substantially along line 2 — 2 of FIG. 1;

FIG. 3 is a view similar to FIG. 1, with the dial cover removed therefrom;

FIG. 4 is a perspective view of an alternative arrangement of the present invention;

FIG. 5 is a cross-sectional view thereof taken substantially along line 5 — 5 of FIG. 4;

FIG. 6 is a perspective view of still another arrangement of the present invention; and FIG. 7 is a cross-sectional view taken substantially along line 7 — 7 of FIG. 6.

DESCRIPTION OF THE PREFERRED EMBODIMENT

Referring to the drawings and more particularly to FIGS. 1, 2 and 3, there is illustrated a visual dial-indicator device, generally referenced by numeral 10. The device 10 comprises a base member, indicated generally at 12, having a circular wall 14 which is provided with a radially and outwardly extending lip or flange 16. This annular flange as so disposed defines a recessed area 18. However, included within said recessed area and centrally disposed therein as an integral part of wall 14, there is a boss member 20 adapted with a bore 22 having an enlarged counter bore 23 superposed thereon and disposed on the rearward face of said base member 12.

Rotatably secured to the base member 12 is a dial cover 24 provided with a slightly larger overall diameter than said base member 12, the cover being notched as at 26 to form an opening therein whereby a selected portion of the recessed area can be exposed. This dial cover 24 is serrated on the outside diameter so that the fingers can turn said member without slipping. In order to provide rotatable movement to the cover 24, a connecting means is inserted within bores 22 and 23, and passes through hole 28 centrally disposed in the dial cover. The connecting means in this particular embodiment comprises a rivet pin 30 having head 31 at one end thereof, with the body portion 32 extending through hole 28 and bore 22, and terminating with an enlarged flanged member 34 which is received in the enlarged bore 23 of the base 12.

Accordingly, included and disposed within the recessed area 18 is a means by which the status of stocked items can be visually ascertained at a glance. This means can take various forms and, as one example, there is shown in FIGS. 7 through 3 a thin sheet material 32 of either paper or plastic having printed thereon a multiplicity of various colors to indicate different conditions that might prevail as to the amount of supplies related to that particular indicator device.

As an example, the sheet material 32 is shown in FIG. 3 as having three distinct colors printed thereon defining three juxtaposed sections, wherein section 38 is indicated as being red, section 40 being indicated as yellow, and section 42 being indicated as green. Hence, where this particular mode is secured to a storage bin or box, it will readily indicate the status of the inventory of that particular part. For example, when a stock clerk draws stock from the bin and the inventory falls below the inventory level posted on that bin, he then turns the dial cover exposing the red section 38 that indicates the items in said bin should be re-ordered. The chief stock clerk, at a later time, makes a survey of all stock, thus putting on order all parts with their indicator dial turned to red. At this time, the chief stock clerk rotates the dial cover to expose the yellow section 40. This indicates to all personnel that the low level has been recorded and an order to replenish the stock has been made. When the stock item is received and the bin is at its proper stock level, the dial is again returned to the green section 42. Thus, a very simple account of the bin stock can be kept and easily monitored by all employees.

It should be noted that the annular lip or flange 16 is adapted with equally-spaced notches 44 which are designed to receive corresponding, projecting, teeth-like members 46 — thus providing a restraining means whereby the dial is prevented from freely rotating about the base member.

Various means for securing the device 10 in a stationary condition have been contemplated — that is, the securing of said device to a storage bin or box, or to an edge of a shelf or the like. The embodiments are herein described and shown as having a very simple and economical securing means, whereby the rear face portion of the base member 12 is coated with a pressure-sensitive adhesive 48 which is generally protected by a thin sheet of paper 49 and is well known in the art. Accordingly, the protective paper is peeled off and the device secured to any desirable location.

Referring now to FIGS. 4 and 5, there is shown an alternative arrangement of the present invention having generally similar members as described above. The base member 50 is identical in configuration as described for base member 12, having an annularly-extending flange or lip 52, including radial notches 54 and a recessed area 56 defined by the annular flange 52. The face of the recessed area can be either marked directly thereon; or, if preferred, a sheet of material can be attached having the required markings relative to the use of said device. As an example, it can be seen in FIG. 4 that the exposed section 58 is provided with not only color indications but, in addition, said section is provided with indicia relative to the meaning of the colors. Hence, the line shading represents the color red which is superposed with the word "Order". Therefore, it can be understood that various written materials can be included with the coloring or used alone, depending on the required usage.

However, in this embodiment the dial cover 60 is designed to incorporate means for readily rotating the dial about the base member, said means comprising a pair of ears 62 extending outwardly from the cover and each ear being oppositely disposed to one another along the central portion of the dial, so that the dial can be easily rotated and whereby the projecting teeth 64 received in notches 54 are disengaged therefrom. The connecting means as shown in FIG. 5 employs a projecting button 66 which is formed as an integral part of the dial cover 60 and is force fitted through bore 68 of the base member 50 to a point at which the enlarged, pliable, head portion 70 of the button expands within the enlarged bore 72, thus securing the dial cover 60 in a rotational relationship with the base member.

Referring now to FIGS. 6 and 7, there is illustrated a third embodiment of the present invention. This embodiment comprises a base member 75 having a recessed area 76 wherein various markings, as described heretofore, can be disposed. Said base 75 includes an annular groove 78 in which an annular matching tongue 80 is slidably received therein, said tongue being formed as an integral part of the dial cover 82 and disposed on the inner face of the annular wall 84 thereof. The dial cover forms a cap-like member rotatable about the base member 75 and having provided therein an opening by which the markings disposed in said recessed area can be seen.

Restraining means are also included within this embodiment. However, in place of teeth and corresponding notches, there is shown a nipple 86 projecting from the inner face of the annular wall 84 adjacent said annular tongue 80, said nipple being adapted to be removably received in equally-spaced detents, such as at 88. Thus, by a slight rotational force on the cap 82, the nipple disengages the detent for rotation about said base.

The invention and its attendant advantages will be understood from the foregoing description and it will be apparent that various changes may be made in the form, construction and arrangement of the parts of the invention without departing from the spirit and scope thereof, or sacrificing its material advantages, the arrangements hereinbefore described being merely by way of example, and we do not wish to be restricted to the specific forms shown or uses mentioned, except as defined in the accompanying claims.

We claim:

1. A dial-indicator device comprising:

an annular base member having an outwardly-extending lip member defining a recessed area, and including a central bore and an enlarged counter bore centrally disposed therein;

a dial cover rotatably secured to said base member and covering said recessed area, said cover having an opening therein whereby a selective portion of said recessed area is exposed;

a plurality of marked sections disposed within said recess, and wherein each of said marked sections is provided with a corresponding size and configuration to that of said opening in said cover;

a rotatable connecting means comprising a projecting button formed as an integral part of said cover, and having a head portion adapted to be operably received within both of said bores disposed in said base member, whereby said cover and said button rotate together with respect to said base member;

a plurality of various indicia disposed on a wall within said recessed area;

a restraining means connected between said cover and said base member, whereby said cover is held in place to expose the selective indicia through said opening in said cover, wherein said restraining means comprises:

a plurality of notches disposed about the annular lip member; and a plurality of corresponding teeth formed on the cover and projecting inwardly therefrom for engagement with said notches; and a rotating means attached to said dial cover whereby said cover is rotated about said base member.

2. A dial-indicator device as recited in claim 1, wherein said indicia is represented as various individual and distinct colors disposed within each section.

3. A dial-indicator device as recited in claim 1, wherein said indicia is represented as letters in the form of words or numbers disposed within each of said sections.

* * * * *